United States Patent
Cox et al.

(10) Patent No.: US 6,601,142 B2
(45) Date of Patent: Jul. 29, 2003

(54) ENHANCED FRAGMENT CACHE

(75) Inventors: John S. Cox, Apex, NC (US); Brian Keith Martin, Cary, NC (US); Daniel Christopher Shupp, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 09/957,930

(22) Filed: Sep. 21, 2001

(65) Prior Publication Data

US 2003/0061442 A1 Mar. 27, 2003

(51) Int. Cl.$^7$ .............................................. G06F 12/00
(52) U.S. Cl. ...................... 711/118; 711/156; 709/216; 345/557
(58) Field of Search ...................... 345/557; 709/216; 711/118, 121, 156

(56) References Cited

U.S. PATENT DOCUMENTS 6,405,252 B1 * 6/2002 Gupta et al. ................ 709/224

OTHER PUBLICATIONS

Ferguson, D.F. and Kerth, R., *WebSphere As An E–Business Server*, IBM Software, <http://researchweb.watson.ibm.com/journal/sj/401/ferguson.html>, (Sep. 4, 2001).

* cited by examiner

*Primary Examiner*—Do Hyun Yoo
*Assistant Examiner*—C. P. Chace
(74) *Attorney, Agent, or Firm*—A. Bruce Clay

(57) ABSTRACT

A method for enhanced fragment caching. The method can include identifying in at least one of first and second retrieved page fragments a variable object utilized by the fragment upon execution to produce dynamic content. Separate cache entries can be written for the first and second retrieved page fragments where the first and second retrieved page fragments differ in ways other than an evaluation of the variable object. Otherwise, a single cache entry can be written for both the first and second retrieved page fragments where the first and second retrieved page fragments differ only in the evaluation of the variable object.

12 Claims, 2 Drawing Sheets

| ENTRY ID | OUTPUT STRINGS | PLACE HOLDERS | SIDE EFFECTS | VPH |
|---|---|---|---|---|
| 1 | text & data | include fragment 45 | encoding=xyz | time |
| 2 | text & data | forward fragment 34 | n/a | day |
| 3 | text & data | forward fragment 32 | n/a | color |
| ... | | | | |
| n-2 | text & data | include fragment 1 | n/a | first_name |
| n-1 | text & data | include fragment 12 | encoding=abc | status |
| n | text & data | n/a | encoding=xyz | confirmation_num |

| ENTRY ID | OUTPUT STRINGS | PLACE HOLDERS | SIDE EFFECTS | VPH |
|---|---|---|---|---|
| 1 | text & data | include fragment 45 | encoding=xyz | time |
| 2 | text & data | forward fragment 34 | n/a | day |
| 3 | text & data | forward fragment 32 | n/a | color |
| ... | | | | |
| n-2 | text & data | include fragment 1 | n/a | first_name |
| n-1 | text & data | include fragment 12 | encoding=abc | status |
| n | text & data | n/a | encoding=xyz | confirmation_num |

FIG. 2

ENHANCED FRAGMENT CACHE

BACKGROUND OF THE INVENTION

1. Technical Field

The present invention relates to the file caching and more particularly to an enhanced fragment cache configured to cache page fragments whose contents vary depending upon one or more variables.

2. Description of the Related Art

Recently, information technologists have become concerned with the overall scalability of their information technology infrastructure. Notwithstanding, when investigating the causes for concern at typical business-to-consumer sites, it has been discovered that information technologists generally remain satisfied with the scalability of their core business logic executing on large, back-end computing systems. Rather, the concerns of information technologists typically are focused on the presentation layer of network deployed applications.

Importantly, the presentation layer is the focus of concern because the presentation layer can be considered a fairly new part of the information technology infrastructure. Also, the presentation layer often must handle a steadily growing demand for data in the form of network requests. Finally, the presentation layer must accommodate increasingly more complex presentation logic. Still, back-end servers hosting back-end application logic and data, by comparison, technically are more sophisticated than those systems hosting the presentation layer and, in consequence, back-end servers tend to accommodate growth more easily. Furthermore, traffic on the back-end servers tends not to increase as sharply as traffic on the front-end systems since not every network request leads to a business transaction which must be processed in the back-end servers. As a result, recent application server innovations focus on methods and systems for enhancing the performance and scalability of the presentation layer. More particularly, caching algorithms often are utilized to assist in this endeavor.

One such application server, the Websphere™ application server manufactured by International Business Machines Corporation of Armonk, N.Y., incorporates an advanced caching system referred to as a "dynamic fragment cache" which enables caching of partial Web pages. By caching partial Web pages, the page fragment cache avoids the overhead of re-executing portions of the presentation logic on subsequent network requests. Advantageously, unlike conventional page caches, the dynamic fragment cache can selectively cache and refresh fragments of a page rather than the entire pages. Hence, the dynamic fragment cache more efficiently utilizes the resources of its host.

Nevertheless, the dynamic fragment cache in certain circumstances can fall short of providing the degree of flexibility that is required by many network sites serving dynamic content. Specifically, in the Web application server environment, fragments produced dynamically by scripts, servlets and the like often change their output depending upon the different variables utilized by the script or servlet during its execution. Often, only the value of one or more of these variables differs between different executions of a fragment. Notably, in the dynamic fragment cache of the Websphere environment, when the dynamic fragment cache caches the output of different executions fo the same page fragment, the page fragment must be executed for each combination of input variables. In consequence, a fragment cache entry must be created for each of the multiple page fragments, though the multiple page fragments differ only in the value of one or more of these variables.

SUMMARY OF THE INVENTION

The present invention addresses the deficiencies of the prior art by providing a method and system for enhanced fragment caching in which only a single cache entry is written for page fragments which differ only in their evaluation of a variable object when producing dynamic content. Specifically, a method for enhanced fragment caching can include identifying in at least one of first and second retrieved page fragments a variable object utilized by the fragment upon execution to produce dynamic content. Separate cache entries can be written for the first and second retrieved page fragments where the first and second retrieved page fragments differ in ways other than an evaluation of the variable object. Otherwise, a single cache entry can be written for both the first and second retrieved page fragments where the first and second retrieved page fragments differ only in the evaluation of the variable object.

The enhanced fragment cache of the present invention can include one or more cache entries, at least a portion of which can store static content associated with a corresponding page fragment; and, at least one variable place holder in one of the cache entries, the variable place holder storing a reference to a variable object utilized by the corresponding page fragment upon execution to produce dynamic content. The enhanced fragment cache of the present invention also can include an applications programming interface (API) having one or more user-accessible functions for interacting with and configuring the enhanced fragment cache. The user-accessible functions, in turn, can include at least one user-accessible function for directing the enhanced fragment cache to store a reference to a variable object in a variable place holder in a cache entry.

In one particular aspect of the present invention, the method for enhanced fragment caching can include identifying in a first retrieved page fragment a variable object utilized by the first page fragment upon execution to produce dynamic content. While static portions of the first page fragment can be stored in a cache entry, importantly, a placeholder can be further stored in the cache entry for the variable object. Notably, both the static portions of the first page fragment stored in the cache entry, and also the associated dynamic content produced by evaluating the variable object, can be served from the cache entry.

In addition to the first page fragment, an additional page fragment can be retrieved and another variable object can be identified therein, wherein the variable object can be utilized by the additional page fragment upon execution to produce dynamic content. It can be determined whether the additional page fragment differs from the first page fragment only in the evaluation of the variable objects. In consequence, static portions of the additional page fragment can be stored in a subsequent cache entry only if the additional page fragment differs from the first page fragment in ways other than the evaluation of the variable objects.

In a second aspect of the present invention, a method for enhanced fragment caching can include programming a page fragment to produce dynamic content based upon values for one or more variable objects; configuring the page fragment with a fragment cache instruction to store references to one or more variable objects in corresponding variable place holders in a cache entry in a fragment cache; and, deploying the configured and programmed page fragment in a content server associated with the fragment cache.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
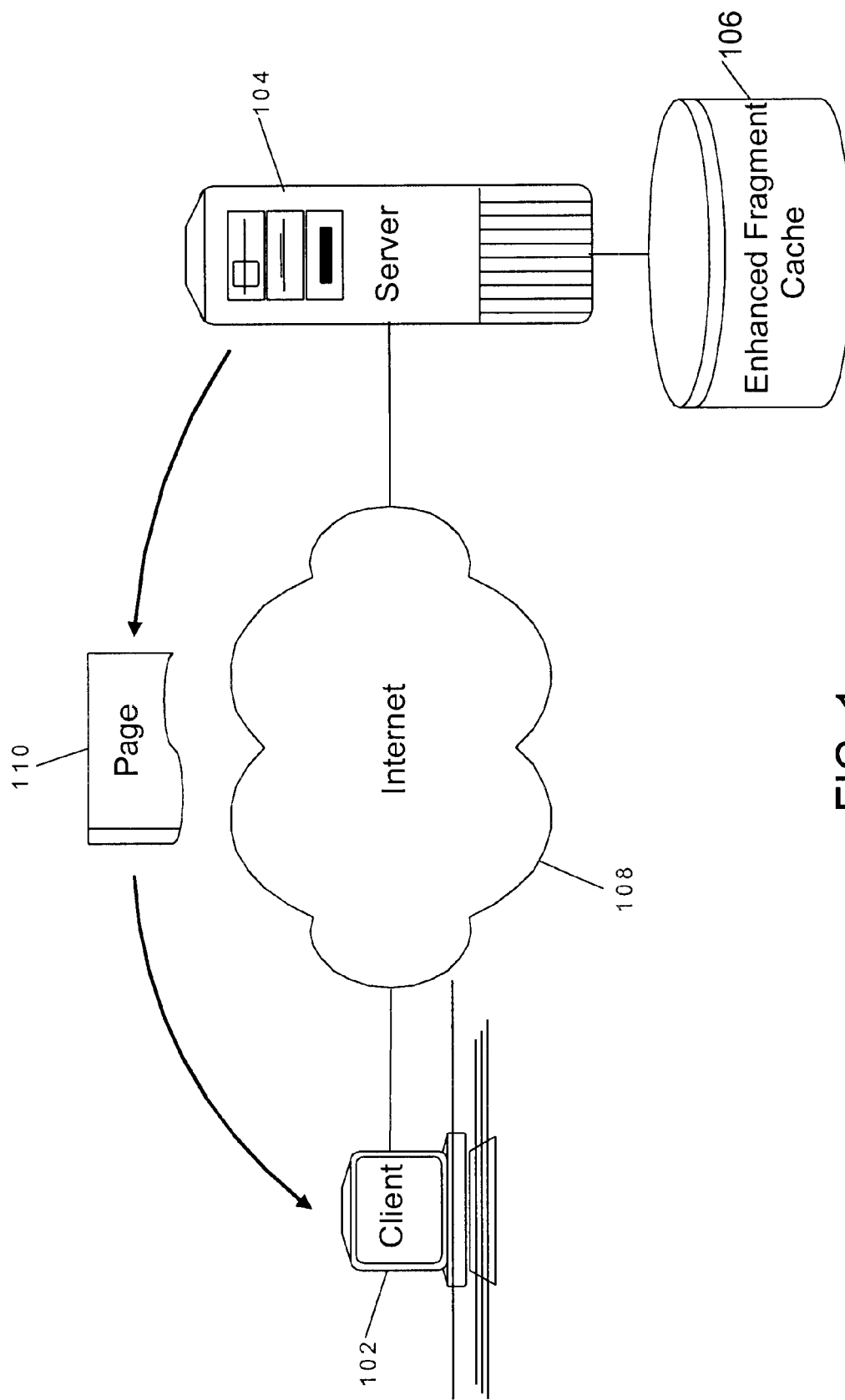
FIG. 1 is a schematic illustration of a content distribution system which has been configured to cache page fragments utilizing an enhanced fragment cache according to the present invention; and, FIG. 2 is a table which depicts an exemplary configuration for an enhanced fragment cache according to the present invention.

The present invention is an enhanced fragment cache which extends the capabilities of a conventional fragment cache to accommodate page fragments whose contents can vary depending upon the value of objects necessary for the execution of the fragment. Importantly, a page fragment, or "fragment", as used herein refers to a portion of network distributable content, for instance a Web page containing dynamic content, wherein the fragment has been formatted using a markup language for example HTML, XML, WML or any other of the countless similarly structured markup languages.

In particular, the dynamic content can be generated at the behest of client-side or server-side logic typically specified by a script such as a Javascript or Visual Basic script, and more particularly, by server-side logic such as a servlet. Whilst static content can be cached conventionally as this type of content does not vary from content request to content request, the dynamic content can vary depending upon the value of variables necessary for the execution of associated logic. Accordingly, the enhanced fragment cache of the present invention can efficiently cache fragments incorporating such dynamic content without being compelled to write a cache entry for each such instance of a fragment whose evaluation differs from other fragments only in the value of one or more variables.

FIG. 1 is a schematic illustration of a content distribution system which has been configured to cache page fragments utilizing an enhanced fragment cache according to the present invention. As shown in FIG. 1, the content distribution system can include a content server 104 and one or more content clients 102 (although only one content client 102 is shown for ease of illustration). The content server 104 and content clients 102 can be communicatively linked over a computer communications network 108 such as the Internet. The content server 104 can respond to content requests provided by the content clients 102. More particularly, the content server 104 can reply to content requests by serving the requested content 110 to the content clients 102.

Notably, as will be apparent to one skilled in the art, the content distribution system illustrated in FIG. 1 can be adapted for use on the Internet wherein the content server 104 is a Web server and the content clients 102 are Web browsers. In that scenario, the content server 104 can respond to HTTP requests issued by Web browsers 102 by serving Web pages 110. Moreover, the content server 104 can be an application server such as Websphere in which case the content server can handle more complex content requests by serving network distributable content which includes not only static data, but also dynamically generated data. Specifically, the dynamic data can be generated in consequence of one or more scripts or servlets which can generate data based upon the value of one or more variables.

The content distribution system of FIG. 1 further can include an enhanced fragment cache 106 which has been configured in accordance with the inventive arrangements. In particular, the enhanced fragment cache 106 can store therein fragments of requested content, for example Web page fragments. As would be the case with a conventional fragment cache, in the present invention, as the content server 104 received content requests, the content server 104 first can inspect the cache entries in the enhanced fragment cache 106 to determine whether the enhanced fragment cache 106 already contains any portion of the requested content. If so, the content server 104 can retrieve the particular fragment from the enhanced fragment cache 106 which corresponds to that portion of the requested content determined to exist in the enhanced fragment cache 106. Subsequently, the content server 104 can include such retrieved fragment in its response to the requesting client 102.

Importantly, by retrieving the fragment from the enhanced fragment cache 106, it is not necessary for the content server 104 to execute the script or servlet which ordinarily would produce the fragment. In this way, the content server 104 can respond much more quickly to the content request without first having to wait for the results of the execution of the script or servlet. Notwithstanding, in a conventional fragment cache, cache entries must be maintained for each possible variation of execution for a page fragment inasmuch as the output from the execution of the fragment can vary depending upon the value of one or more execution variables. In the enhanced fragment cache 106 of the present invention, however, a single cache entry can be maintained for all possible outputs which can be produced by the execution of any one page fragment.

FIG. 2 is a table which depicts an exemplary configuration for an enhanced fragment cache according to the present invention. As shown in FIG. 2, the enhanced fragment cache 106 of FIG. 1 can include a plurality of cache entries. Each cache entry can include an ordered list of output strings 202, for instance the text and data output a script or servlet associated with the fragment, one or more place holders 204 which can include data necessary either to include output from another fragment, or to forward the output of the fragment to another fragment, and side effects 206, for instance data necessary to modify the language encoding of a page. When the enhanced fragment cache 106 serves a page fragment stored from a cache entry, this list can be processed in order of its fields.

Significantly, in accordance with the inventive arrangements, the enhanced fragment cache 106 further can include one or more additional fields each referred to herein as a Variable Place Holder (VPH) 208. Each VPH 208 can store therein a reference to a variable or other such object which can be used by a script or servlet in generating content for inclusion in a page fragment associated with the corresponding cache entry. Specifically, each VPH 208 can direct the enhanced fragment cache 106 to include the value of its associated variable when evaluating a corresponding page fragment. In consequence, each cache entry can remain valid for all executions a page fragment despite changing values for the variable.

Notably, the enhanced fragment cache 106 of FIGS. 1 and 2 can be configured by an applications programmer to use a VPH 208 when caching a page fragment. In one aspect of the invention, the enhanced fragment cache 106 can be configured through the use of an API accessible from within the subject fragment. In particular, when writing a cacheable page fragment, the applications developer can use the API to designate when a variable should be handled in a VPH 208 during the caching process. Thus, during evaluation of the page fragment, when its cache entry is first constructed, a reference to the variable can be added to a VPH 208 in an associated cache entry. Notably, for servlets, the API can be used directly. By comparison, when coding a Java Server Page (JSP), a tag library can be used, so that instead of calling Java methods, an easier JSP-like syntax can specify the variable to be included in a VPH 208.

In sum, in the present invention only a single fragment cache entry need be maintained for fragments which incorporate dynamically generated data. Specifically, the enhanced fragment cache of the present invention can permit cached fragments to include placeholders for objects available to the fragment during its execution. Thus the fragment cache of the present invention need only hold a single entry for all possible executions of a servlet or script, and can include the values of those objects when serving the fragment from the cache. In consequence, the speed of the cache can be increased, since logic associated with the fragment is executed less often and the cache can serve requested content more often. In addition, the number of entries in the cache can be reduced inasmuch as separate cache entries are not necessary for content which differs only in the objects necessary to generate dynamic data in the fragment.

The present invention can be realized in hardware, software, or a combination of hardware and software. A method for enhanced fragment caching in accordance with the present invention can be realized in a centralized fashion in one computer system, or in a distributed fashion where different elements are spread across several interconnected computer systems. Any kind of computer system, or other apparatus adapted for carrying out the methods described herein, is suited.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for enhanced fragment caching comprising the steps of:

identifying in a first retrieved page fragment a variable object utilized by said first page fragment upon execution to produce dynamic content;

storing static portions of said first page fragment in a cache entry, and further storing a placeholder in said cache entry for said variable object; and, serving from said cache entry said static portions of said first page fragment and associated dynamic content produced by evaluating said variable object stored in said cache entry.

2. The method of claim 1, further comprising the steps of:

retrieving a subsequent page fragment and identifying in said subsequent page fragment another variable object utilized by said subsequent page fragment upon execution to produce dynamic content;

determining whether said subsequent page fragment differs from said first page fragment only in said evaluation of said variable objects; and, storing static portions of said subsequent page fragment in a subsequent cache entry only if said subsequent page fragment differs from said first page fragment in ways other than said evaluation of said variable objects.

3. An enhanced fragment cache comprising:

a plurality of cache entries, at least a portion of each said cache entry storing static content associated with a corresponding page fragment; and, at least one variable place holder in one of said cache entries, said variable place holder storing a reference to a variable object utilized by said corresponding page fragment upon execution to produce dynamic content.

4. The enhanced fragment cache of claim 3, further comprising:

an applications programming interface (API) comprising a plurality of user-accessible functions for interacting with and configuring the enhanced fragment cache, said plurality of user-accessible functions comprising at least one user-accessible function for directing the enhanced fragment cache to store a reference to a variable object in said at least one variable place holder in said one of said cache entries.

5. A method for enhanced fragment caching comprising the steps of:

programming a page fragment to produce dynamic content based upon values for one or more variable objects;

configuring said page fragment with a fragment cache instruction to store references to said one or more variable objects in corresponding variable place holders in a cache entry in an fragment cache; and, deploying said configured and programmed page fragment in a content server associated with said fragment cache.

6. A method for enhanced fragment caching comprising the steps of:

identifying in at least one of first and second retrieved page fragments a variable object utilized by said at least one fragment upon execution to produce dynamic content;

writing separate cache entries for said first and second retrieved page fragments where said first and second retrieved page fragments differ in ways other than an evaluation of said variable object; and, writing a single cache entry for both said first and second retrieved page fragments where said first and second retrieved page fragments differ only in said evaluation of said variable object.

7. A method for enhanced fragment caching comprising the steps of:

identifying in each of first and second retrieved page fragments a variable object utilized by said at least one fragment upon execution to produce dynamic content; and, writing a single cache entry for both said first and second retrieved page fragments where said first and second retrieved page fragments differ only in said evaluation of said variable object.

8. A machine readable storage having stored thereon a computer program for enhanced fragment caching, said computer program comprising a routing set of instructions for causing the machine to perform the steps of:

identifying in a first retrieved page fragment a variable object utilized by said first page fragment upon execution to produce dynamic content;

storing static portions of said first page fragment in a cache entry, and further storing a placeholder in said cache entry for said variable object; and, serving from said cache entry said static portions of said first page fragment and associated dynamic content produced by evaluating said variable object stored in said cache entry.

9. The machine readable storage of claim 8, further comprising the steps of:

retrieving a subsequent page fragment and identifying in said subsequent page fragment another variable object utilized by said subsequent page fragment upon execution to produce dynamic content;

determining whether said subsequent page fragment differs from said first page fragment only in said evaluation of said variable objects; and, storing static portions of said subsequent page fragment in a subsequent cache entry only if said subsequent page fragment differs from said first page fragment in ways other than said evaluation of said variable objects.

10. A machine readable storage having stored thereon a computer program for enhanced fragment caching, said computer program comprising a routing set of instructions for causing the machine to perform the steps of:

programming a page fragment to produce dynamic content based upon values for one or more variable objects;

configuring said page fragment with a fragment cache instruction to store references to said one or more variable objects in corresponding variable place holders in a cache entry in an fragment cache; and, deploying said configured and programmed page fragment in a content server associated with said fragment cache.

11. A machine readable storage having stored thereon a computer program for enhanced fragment caching, said computer program comprising a routing set of instructions for causing the machine to perform the steps of:

identifying in at least one of first and second retrieved page fragments a variable object utilized by said at least one fragment upon execution to produce dynamic content;

writing separate cache entries for said first and second retrieved page fragments where said first and second retrieved page fragments differ in ways other than an evaluation of said variable object; and, writing a single cache entry for both said first and second retrieved page fragments where said first and second retrieved page fragments differ only in said evaluation of said variable object.

12. A machine readable storage having stored thereon a computer program for enhanced fragment caching, said computer program comprising a routing set of instructions for causing the machine to perform the steps of:

identifying in each of first and second retrieved page fragments a variable object utilized by said at least one fragment upon execution to produce dynamic content; and, writing a single cache entry for both said first and second retrieved page fragments where said first and second retrieved page fragments differ only in said evaluation of said variable object.

* * * * *